(12) United States Patent
Stegemann et al.

(10) Patent No.: US 12,405,911 B2
(45) Date of Patent: Sep. 2, 2025

(54) TRANSFER DEVICE FOR A DIFFERENTIAL BUS SYSTEM

(71) Applicant: Robert Bosch GmbH, Stuttgart (DE)

(72) Inventors: Sebastian Stegemann, Tuebingen (DE); Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 105 days.

(21) Appl. No.: 18/250,747

(22) PCT Filed: Oct. 6, 2021

(86) PCT No.: PCT/EP2021/077548
§ 371 (c)(1),
(2) Date: May 18, 2023

(87) PCT Pub. No.: WO2022/089900
PCT Pub. Date: May 5, 2022

(65) Prior Publication Data
US 2023/0401167 A1 Dec. 14, 2023

(30) Foreign Application Priority Data
Oct. 27, 2020 (DE) ...................... 10 2020 213 482.0

(51) Int. Cl.
G06F 13/40 (2006.01)
(52) U.S. Cl.
CPC ................................ G06F 13/4004 (2013.01)
(58) Field of Classification Search
CPC .................................................. G06F 13/4004
See application file for complete search history.

(56) References Cited

U.S. PATENT DOCUMENTS 6,473,648 B1 * 10/2002 Prutchi .............. A61N 1/36521
607/28
7,057,397 B1 * 6/2006 Davidson ............. G11C 29/022
324/606
9,048,725 B2 * 6/2015 Leijon ................... H02M 7/103

FOREIGN PATENT DOCUMENTS

| DE | 102004056305 A1 * | 7/2005 | ......... G06F 13/4072 |
| DE | 102018203672 A1 * | 9/2019 | ............. G08B 25/10 |
| EP | 3001698 B1 * | 7/2019 | ............ H04R 1/1033 |
| WO | WO-2005106901 A2 * | 11/2005 | .............. H01F 38/14 |
| WO | 2021099304 A1 | 5/2021 | |

OTHER PUBLICATIONS

Translation of DE 102018203672 A1 (Year: 2019).*
Translation of DE-102004056305-A1 (Year: 2005).*
International Search Report for PCT/EP2021/077548, Issued Jan. 24, 2022.

* cited by examiner

Primary Examiner — Henry Tsai
Assistant Examiner — John B Roche
(74) Attorney, Agent, or Firm — NORTON ROSE FULBRIGHT US LLP

(57) ABSTRACT

A transfer device for a differential bus system. The transfer device includes a first bus connection and a second bus connection for connection to a transfer medium of the differential bus system, a transmitting device that is connected and/or connectable to the first bus connection and the second bus connection, and an impedance adaptation circuit that is designed to influence an impedance at the first bus connection and/or at the second bus connection.

14 Claims, 5 Drawing Sheets

TRANSFER DEVICE FOR A DIFFERENTIAL BUS SYSTEM

FIELD

The present invention relates to a transfer device for a differential bus system.

Moreover, the present invention relates to a method for operating a transfer device for a differential bus system.

SUMMARY

Exemplary specific embodiments of the present invention relate to a transfer device for a differential bus system, including a first bus connection and a second bus connection for connection to a transfer medium of the differential bus system, for example to differential bus lines, and including a transmitting device that is connected and/or connectable to the first bus connection and the second bus connection, further including an impedance adaptation circuit that is designed to influence an impedance at the first bus connection and/or at the second bus connection. In some specific embodiments, this allows at least temporary reduction of electromagnetic emissions of the transfer device and/or greater interference immunity.

In further exemplary specific embodiments of the present invention, it is provided that the impedance adaptation circuit is designed to influence the impedance at the first bus connection ("first impedance") and/or at the second bus connection ("second impedance") in such a way that the impedance at the first bus connection deviates from the impedance at the second bus connection by a maximum predefinable difference value. In further exemplary specific embodiments, this may apply, for example, for at least one predefinable frequency range, for example a subrange of an entire frequency range that is utilized by the bus system, but in other exemplary specific embodiments it may also apply, for example, for the entire frequency range that is utilized by the bus system.

In further exemplary specific embodiments of the present invention, the particular impedance may have values that are, for example, at least temporarily complex, i.e., may include a nonvanishing imaginary part. Accordingly, in further exemplary specific embodiments the above-mentioned difference value may also be complex-valued, for example. In further exemplary specific embodiments, the predefinable difference value may also be purely real or purely imaginary, for example.

In further exemplary specific embodiments of the present invention, it is provided that the impedance adaptation circuit includes at least one active semiconductor element, which in further exemplary specific embodiments allows a particularly efficient and/or precise adaptation of the first and/or second impedance.

In further exemplary specific embodiments of the present invention, it is provided that the impedance adaptation circuit includes a first active semiconductor element and a second active semiconductor element, the first active semiconductor element being connected and/or connectable to the first bus connection, and the second active semiconductor element being connected and/or connectable to the second bus connection.

In further exemplary specific embodiments of the present invention, it is provided that the impedance adaptation circuit includes at least one circuit component that represents a simulation of at least one portion of the transmitting device.

In further exemplary specific embodiments of the present invention, "simulation of at least one portion of the transmitting device" is understood to mean a circuit component that includes the same component types (for example, having the same component parameters or component values except for a predefinable tolerance, for example) in the same topology as the portion in question, for example the simulated portion, of the transmitting device.

In further exemplary specific embodiments of the present invention, it is provided that the impedance adaptation circuit includes at least one circuit component that represents a complete simulation of the transmitting device.

In further exemplary specific embodiments of the present invention, it is provided that the at least one circuit component includes a series connection made up of a first diode and a first transistor and a second transistor. In further exemplary specific embodiments, the first transistor and/or the second transistor are/is in each case designed as a field effect transistor, for example of the n-type metal oxide semiconductor (NMOS) type (n-channel MOSFET) or of the p-type metal oxide semiconductor (PMOS) type (p-channel MOSFET), or as a corresponding "high-voltage" variant of an n-channel MOSFET or p-channel MOSFET.

In further exemplary specific embodiments of the present invention, it is provided that the first diode of the at least one circuit component corresponds to a first diode of the at least one portion of the transmitting device, for example to a type of the first diode of the at least one portion of the transmitting device.

In further exemplary specific embodiments of the present invention, it is provided that the first transistor of the at least one circuit component corresponds to a first transistor of the at least one portion of the transmitting device, for example to a type of the first transistor of the at least one portion of the transmitting device.

In further exemplary specific embodiments of the present invention, it is provided that the second transistor of the at least one circuit component corresponds to a second transistor of the at least one portion of the transmitting device, for example to a type of the second transistor of the at least one portion of the transmitting device.

In further exemplary specific embodiments of the present invention, it is provided that the transfer device includes a receiving device, as a result of which the transfer device may operate, for example at least temporarily, as a transceiver. The principle according to the specific embodiments advantageously allows comparatively low electromagnetic emissions, for example during a reception of signals by the optional receiving device.

In further exemplary specific embodiments of the present invention, it is provided that the bus system includes one of the following types: controller area network (CAN), CAN flexible data rate (CAN FD), CAN FD signal improvement capability (CAN FD SIC), CAN extra large (CAN XL), low-voltage differential signaling (LVDS), 10BASE-T1S.

Further exemplary specific embodiments of the present invention relate to a method for operating a transfer device for a differential bus system, including a first bus connection and a second bus connection for connection to a transfer medium of the differential bus system, for example to differential bus lines, and including a transmitting device that is connected and/or connectable to the first bus connection and the second bus connection, the transfer device including an impedance adaptation circuit, the method including: adapting an impedance at the first bus connection and/or at the second bus connection.

In further exemplary specific embodiments of the present invention, it is provided that the method and/or the transfer device associated with the method include(s) one or multiple of the aspects described above with regard to exemplary specific embodiments of the transfer device.

Further exemplary specific embodiments of the present invention relate to use of the transfer device according to the specific embodiments and/or of the method according to the specific embodiments for at least one of the following elements: a) adapting an impedance (the first impedance and/or the second impedance, for example) at least at the first and/or second bus connection, b) aligning, for example up to a predefinable difference value, the first impedance at the first bus connection with the second impedance at the second bus connection and/or vice versa, c) reducing electromagnetic emissions, for example upon a reception of signals with the aid of the transfer device, d) reducing errors or increasing an efficiency during an arbitration phase, for example for a bus system designed as CAN XL.

Further exemplary specific embodiments of the present invention result from the following description and the figures.

DETAILED DESCRIPTION OF EXAMPLE EMBODIMENTS

Figure 1:
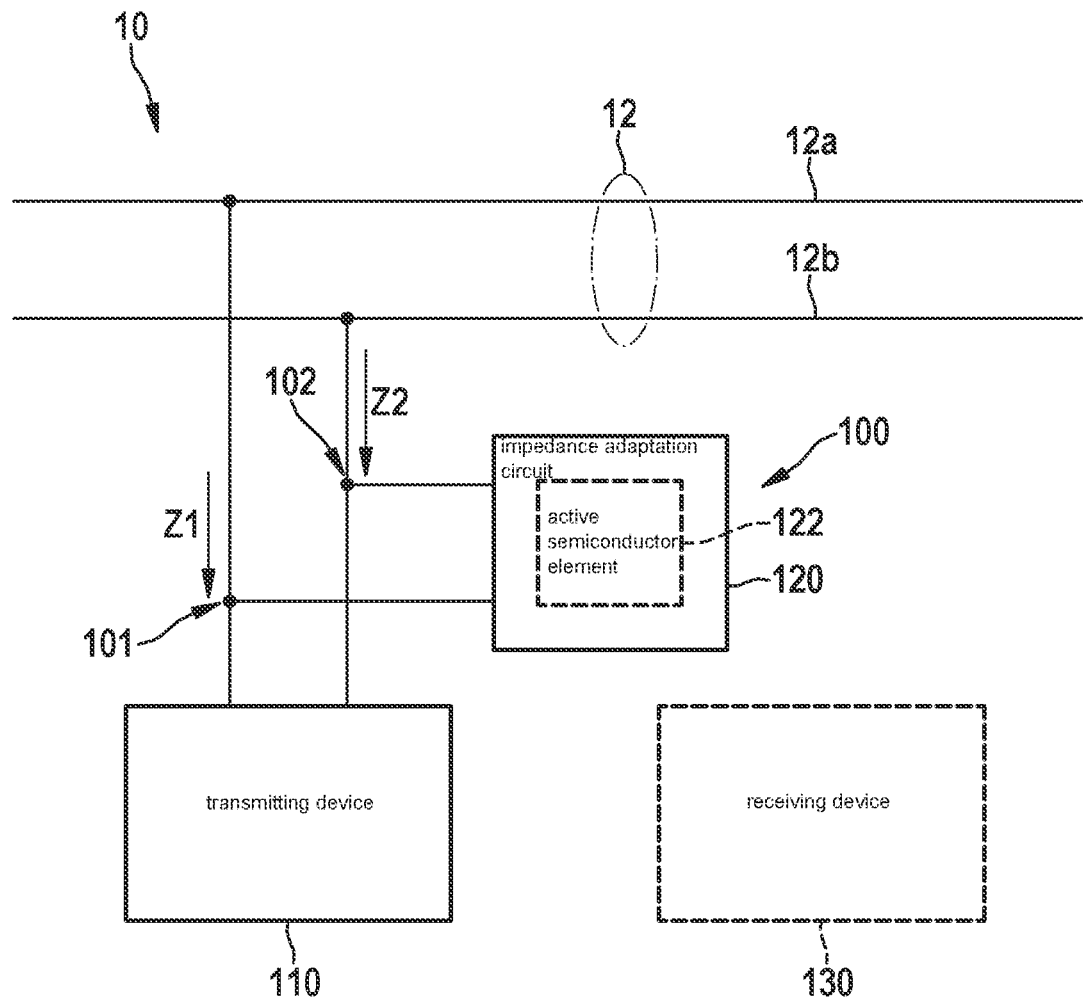
FIG. 1 schematically shows a simplified block diagram according to exemplary specific embodiments of the present invention.

FIG. 1 schematically shows a simplified block diagram of a differential bus system 10 for transferring signals, which is usable, for example, in technical products such as vehicles, in particular motor vehicles, manufacturing-related devices, etc.

Exemplary specific embodiments of the present invention relate to a transfer device 100 for a differential bus system 10. Transfer device 100 includes a first bus connection 101 and a second bus connection 102 for connection to a transfer medium 12 of differential bus system 10, for example to differential bus lines 12a, 12b, and a transmitting device 110 that is connected and/or connectable to first bus connection 101 and to second bus connection 102.

In addition, transfer device 100 includes an impedance adaptation circuit 120 that is designed to influence an impedance at first bus connection 101 and/or at second bus connection 102. In some specific embodiments, this allows at least temporary reduction of electromagnetic emissions of transfer device 100.

In further exemplary specific embodiments, it is provided that impedance adaptation circuit 120 is designed to influence the impedance at first bus connection 101 ("first impedance Z1") and/or at second bus connection 102 ("second impedance Z2") in such a way that impedance Z1 at first bus connection 101 deviates from impedance Z2 at second bus connection 102 by a maximum predefinable difference value.

In further exemplary specific embodiments, this may apply, for example, for at least one predefinable frequency range, for example a subrange of an entire frequency range that is utilized by bus system 10 for the signal transfer, but in other exemplary specific embodiments it may also apply, for example, for the entire frequency range that is utilized by bus system 10.

In further exemplary specific embodiments, particular impedance Z1, Z2 may have values that are, for example, at least temporarily complex, i.e., may include a nonvanishing imaginary part. Accordingly, in further exemplary specific embodiments the above-mentioned difference value may also be complex-valued, for example. In further exemplary specific embodiments, the predefinable difference value may also be purely real or purely imaginary, for example, at least temporarily.

In further exemplary specific embodiments, it is provided that impedance adaptation circuit 120 includes at least one active semiconductor element 122, which in further exemplary specific embodiments allows a particularly efficient and/or precise adaptation of first and/or second impedance Z1, Z2.

In further exemplary specific embodiments, it is provided that transfer device 100 includes an optional receiving device 130 for receiving signals that are transferred via the bus system, as a result of which transfer device 100 may operate, for example at least temporarily, as a transceiver.

The principle according to the specific embodiments advantageously allows, for example during a reception of signals by optional receiving device 130, comparatively low electromagnetic emissions, which in some conventional transfer devices may be caused, for example, by properties of transmitting device 110 and which may, for example, impair the electromagnetic compatibility of the conventional transfer devices.

It is also advantageous that in further exemplary specific embodiments, the principle according to the specific embodiments allows increased interference immunity, since, for example, an identical impedance between the bus connections results in identical currents into the bus connections, so that, for example, no compensating current flows across a bus load resistor, as the result of which, for example, a distortion of a difference signal or differential signal transferred via the bus is avoided.

Figure 2:
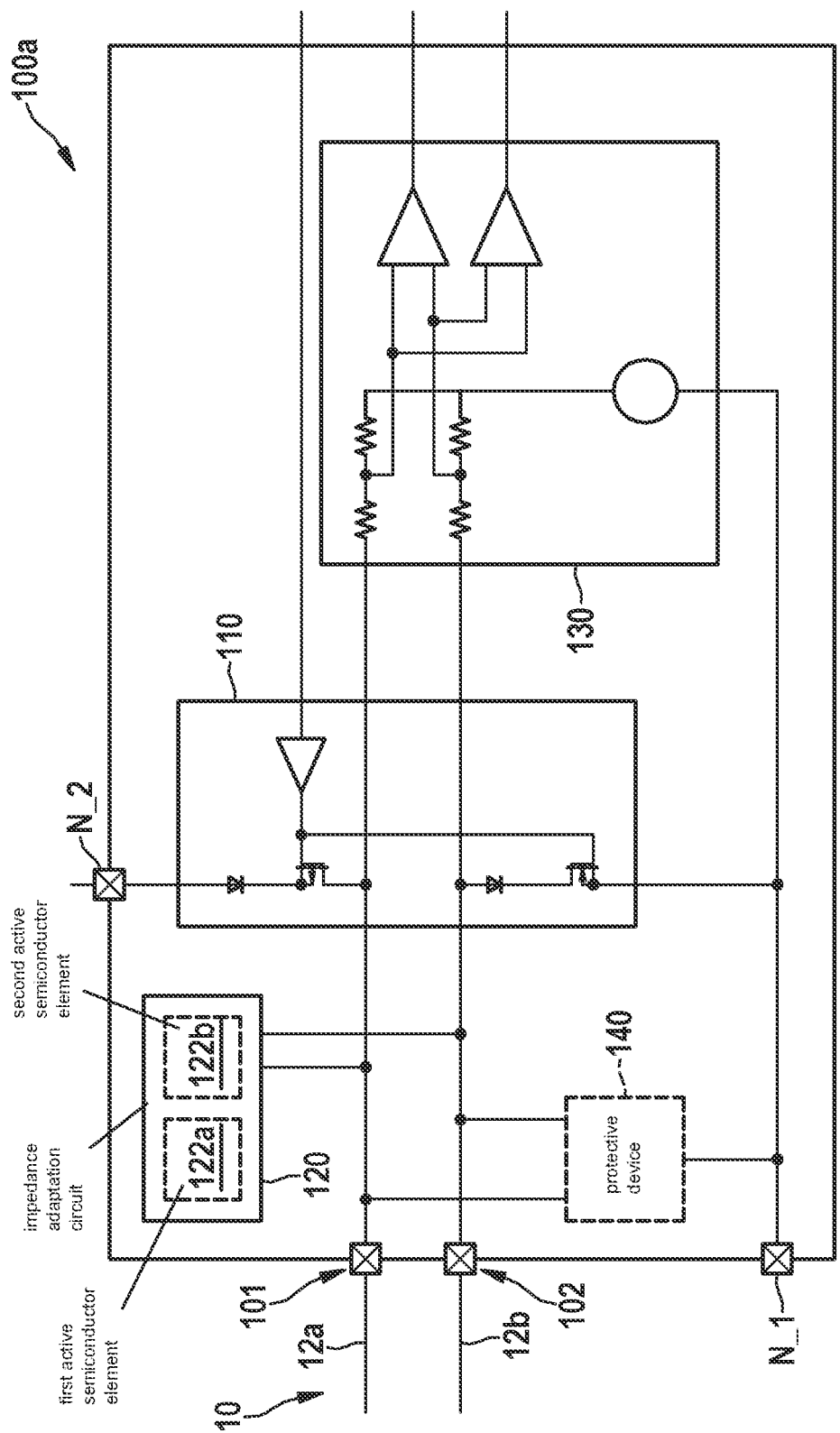
FIG. 2 schematically shows a simplified block diagram according to further exemplary specific embodiments of the present invention.

In further exemplary specific embodiments 100a, cf. FIG. 2, it is provided that impedance adaptation circuit 120 includes a first active semiconductor element 122a and a second active semiconductor element 122b, first active semiconductor element 122a being connected and/or connectable to first bus connection 101, and second active semiconductor element 122b being connected and/or connectable to second bus connection 102.

Example configuration 100a according to FIG. 2, for example together with optional receiving device 130, may form a transceiver 100a or a transceiver module 100a, which in further exemplary specific embodiments also includes an optional protective device 140 for protection from overvoltages or electrostatic discharges (ESDs), and which, for example, is likewise connectable to bus lines 12a, 12b via bus connections 101, 102, for example.

In further exemplary specific embodiments, transceiver module 100a includes a terminal N_1 for a first reference potential of bus system 10, which is a ground potential, for example. In the case of an example design of bus system 10 as a CAN bus system, terminal N_1 may be a "CAN_GND" terminal, for example.

In further exemplary specific embodiments, transceiver module 100a includes a terminal N_2 for a second reference potential of bus system 10, which, for example, is an electrical potential associated with an operating voltage of bus system 10 and/or of transceiver module 100a. In the case of an example design of bus system 10 as a CAN bus system, terminal N_1 may be a "CAN_SUPPLY" terminal, for example.

Figure 3:
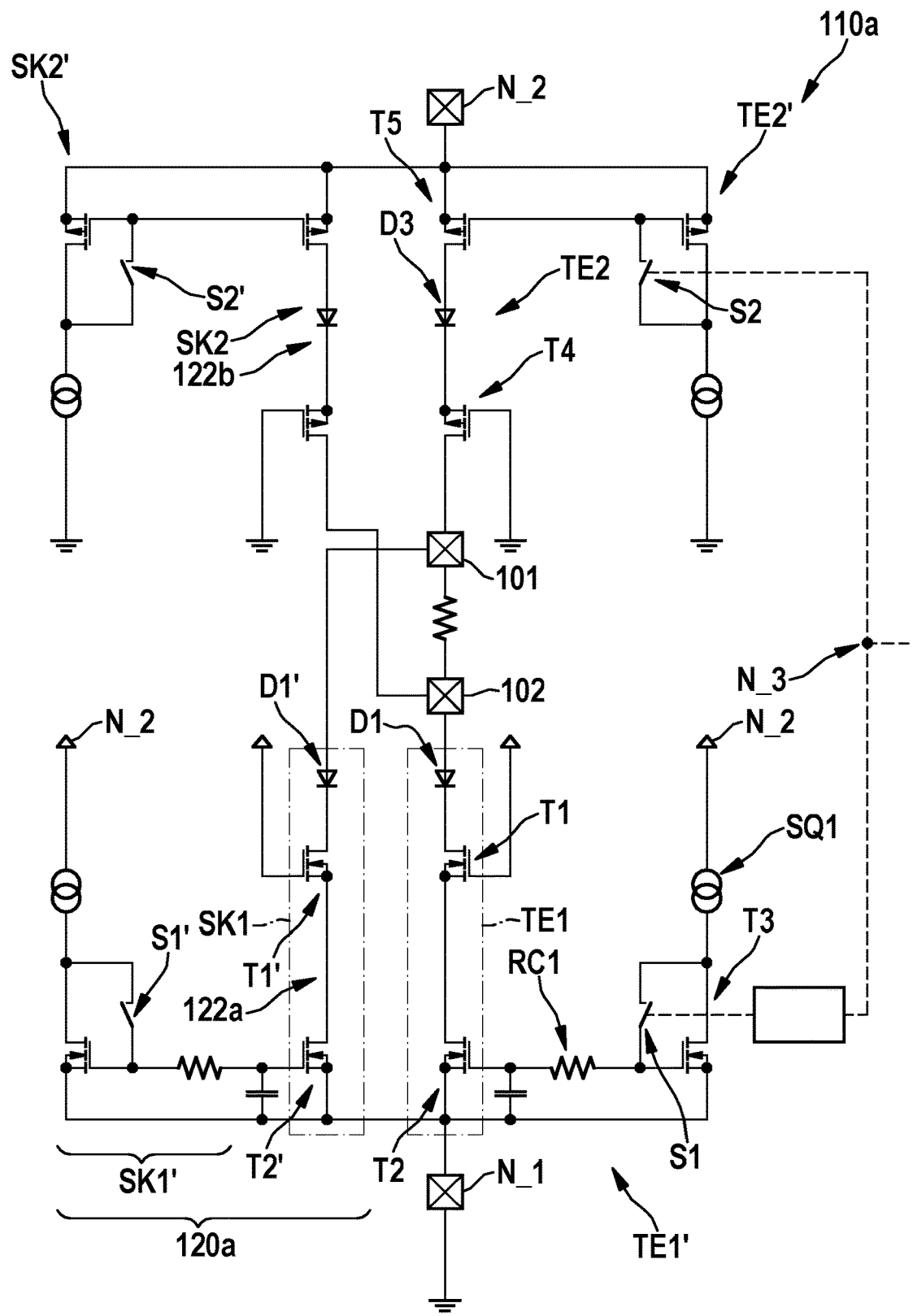
FIG. 3 schematically shows a simplified circuit diagram according to further exemplary specific embodiments of the present invention.

FIG. 3 schematically shows aspects of a transmitting device 110a and an impedance adaptation circuit 120a according to further exemplary specific embodiments. In further exemplary specific embodiments, transmitting device 110a includes a terminal N_3 to which a transmission signal to be sent via bus system 10 (FIG. 1) is suppliable. In further exemplary specific embodiments, transmitting device 110a transforms the transmission signal into a differential signal and outputs the differential signal, via bus connections 101, 102, to transfer medium 12 (FIG. 1) of differential bus system 10.

In further exemplary specific embodiments, it is provided that impedance adaptation circuit 120a includes at least one circuit component SK1, which represents a simulation of at least one portion TE1 of transmitting device 110a.

In further exemplary specific embodiments, "simulation of at least one portion of the transmitting device" is understood to mean a circuit component SK1 that includes the same component types (for example, having the same component parameters or component values except for a predefinable tolerance, for example) in the same topology as the portion in question, for example simulated portion TE1, of transmitting device 110a.

In further exemplary specific embodiments, it is provided that impedance adaptation circuit 120a includes at least one circuit component SK1, SK2, SK1', SK2' or multiple circuit components which, for example with one another, represent(s) a complete simulation of transmitting device 110a.

In further exemplary specific embodiments, it is provided that the at least one circuit component SK1 includes a series connection made up of a first diode D1' and a first transistor T1' and a second transistor T2', for example first transistor T1' corresponding to the at least one active semiconductor element 122a described above as an example. In further exemplary specific embodiments, first transistor T1' and/or second transistor T2' are/is in each case designed as a field effect transistor, for example of the n-type metal oxide semiconductor (NMOS) type (n-channel MOSFET) or of the p-type metal oxide semiconductor (PMOS) type (p-channel MOSFET), or as a corresponding "high-voltage" variant of an n-channel MOSFET or p-channel MOSFET.

In further exemplary specific embodiments, it is provided that first diode D1' of the at least one circuit component SK1 corresponds to a first diode D1 of the at least one portion TE1 of transmitting device 110a, for example to a type of first diode D1 of the at least one portion TE1 of transmitting device 110a.

In further exemplary specific embodiments, it is provided that first transistor T1' of the at least one circuit component SK1 corresponds to a first transistor T1 of the at least one portion TE1 of transmitting device 110a, for example to a type of first transistor T1 of the at least one portion TE1 of transmitting device 110a.

In further exemplary specific embodiments, it is provided that second transistor T2' of the at least one circuit component SK1 corresponds to a second transistor T2 of the at least one portion TE1 of transmitting device 110a, for example to a type of second transistor T2 of the at least one portion TE1 of transmitting device 110a.

The at least one circuit component SK1 of impedance adaptation circuit 120 thus represents, for example, a simulation of portion TE1 of transmitting device 110a. In further exemplary specific embodiments, the same applies for circuit component SK2 with regard to portion TE2 of transmitting device 110a.

In further exemplary specific embodiments, the same applies for further circuit component SK1' with regard to portion TE1' of transmitting device 110a, for example including the circuit components: terminal N_2, a current source SQ1 that is connected to terminal N_2, transistor T3, RC network RC1. In other words, in further exemplary specific embodiments, further circuit component SK1' includes a simulation of portion TE1' of transmitting device 110a, and for example further circuit component SK2' includes a simulation of portion TE2' of transmitting device 110a.

In further exemplary specific embodiments, with their portions TE1, TE2, TE1', TE2', circuit components SK1, SK2, SK1', SK2' of impedance adaptation circuit 120 according to FIG. 3 thus represent a complete simulation of transmitting device 110a.

In further exemplary specific embodiments, first transistor T1 is an n-channel MOSFET, for example a "high-voltage" n-channel MOSFET, for example the same as transistor T1' of impedance adaptation circuit 120a, which corresponds thereto as an example. In further exemplary specific embodiments, second transistor T2 is an n-channel MOSFET, for example the same as transistor T2' of impedance adaptation circuit 120a, which corresponds thereto as an example.

In further exemplary specific embodiments, diode D1 is provided as polarity reversal protection. In further exemplary specific embodiments, it is used, for example, among other things, to decouple the substrate diodes of the subsequent components of series connection D1, T1, T2 (for example, a drain terminal from transistor T1 to a substrate) from bus connection 102, and thus to allow, for example, "insusceptibility" (for example, tolerance to bus voltages of different polarities).

In further exemplary specific embodiments, transistor T4 is designed as a p-channel MOSFET, for example a "high-voltage" p-channel MOSFET, for example to decouple the cathode of diode D3, via its substrate diode, from bus connection 101.

In further exemplary specific embodiments, transistor T5 is designed as a p-channel MOSFET.

Figure 4:
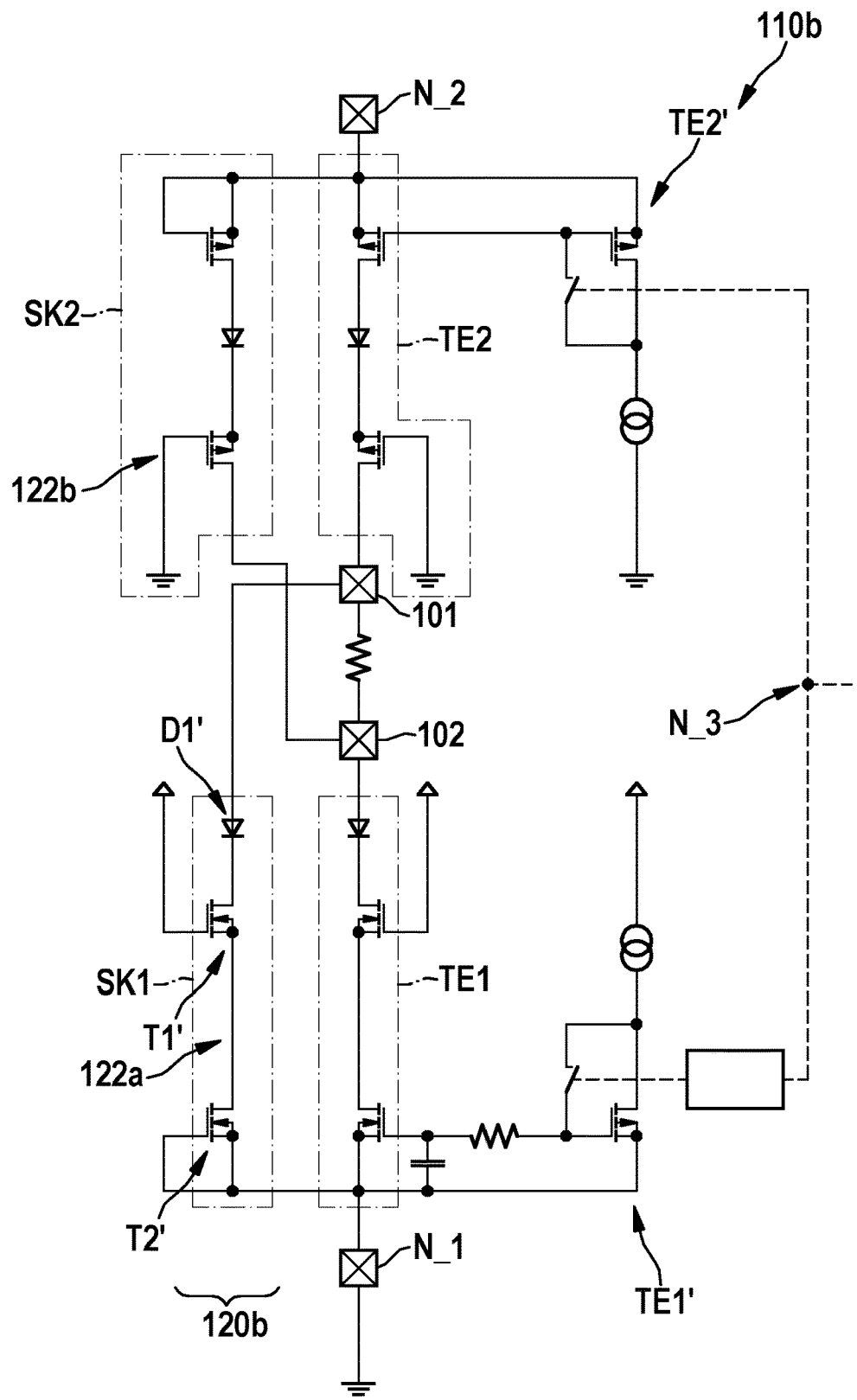
FIG. 4 schematically shows a simplified circuit diagram according to further exemplary specific embodiments of the present invention.

FIG. 4 schematically shows aspects of a transmitting device 110b and an impedance adaptation circuit 120b according to further exemplary specific embodiments. While transmitting device 110b has a structure or topology that is comparable to transmitting device 110a according to FIG. 3, impedance adaptation circuit 120b according to FIG. 4, compared to impedance adaptation circuit 120a according to FIG. 3, is reduced, for example, in such a way that, for example, circuit components SK1', SK2' according to FIG. 3 are not present in impedance adaptation circuit 120b according to FIG. 4. Impedance adaptation circuit 120b according to FIG. 4 thus includes circuit components SK1, SK2 that simulate portions TE1, TE2 of transmitting device 110b, but not further portions TE1', TE2' of transmitting device 110b.

In further exemplary specific embodiments, impedance adaptation circuit 120b according to FIG. 4 may also be used to make an at least partial adaptation of impedances Z1, Z2 (FIG. 1), for example, in such a way that undesirable emissions, for example in a receiving operation of a transfer device that includes transmitting device 110b and impedance adaptation circuit 120b, are reduced. Due to the smaller number of components, specific embodiment 110b according to FIG. 4 has smaller surface area requirements of, for example, a substrate (made of silicon, for example) that is usable for the implementation, compared to specific embodiment 110a according to FIG. 3.

In further exemplary specific embodiments, impedance adaptation circuit 120, 120a, 120b accordingly forms a simulation or copy of transmitting device 110, 110a, 110b, for example circuit components SK1, SK2 (FIG. 3) being inversely connected with regard to bus connections 101, 102, compared to portions TE1, TE2 of transmitting device 110a which are simulated by the circuit components. For example, the series connection made up of components D1', T1', T2' (corresponding to circuit component SK1) is connected to first bus connection 101, whereas circuit portion TE1 of transmitting device 110a, which is simulated by circuit component SK1, is connected to second bus connection 102 (see, for example, the anode, not described in greater detail, of diode D1). In further exemplary specific embodiments, this correspondingly applies for circuit component SK2 (at bus connection 102) and portion TE2 (at bus connection 101).

Due to the above-described interconnection of components SK1, SK2, TE1, TE2 with regard to bus connections 101, 102, in further exemplary specific embodiments, for example a receiving transceiver 100a (FIG. 2) with regard to bus connections 101, 102 (for example, CANH and CANL for a CAN bus system 10) also has same impedance Z1, Z2 (FIG. 1) at its "transmitter" 110a (which is passive during a receiving operation), and its influence on the emission result is thus reduced or eliminated.

In further exemplary specific embodiments, impedance adaptation circuit 120, 120a, 120b, which for example represents a simulation or copy of transmitting device 110, 110a, 110b, is not, for example not at any time, transferred into an active operating mode (comparable to sending via bus connections 101, 102), which in further exemplary specific embodiments may take place at least temporarily, for example for a desired sending operation, for transmitting device 110, 110a, 110b. In FIG. 3 this is symbolized by way of example in that no activation signal acts on switches S1', S2', which thus remain open, for example always, for example in contrast to corresponding switches S1, S2 of transmitting device 110a, which are acted on by the transmission signal from terminal N_3.

In further exemplary specific embodiments, it is provided that bus system 10 (FIG. 1) includes one of the following types: controller area network (CAN), CAN flexible data rate (CAN FD), CAN FD signal improvement capability (CAN FD SIC), CAN extra large (CAN XL), low-voltage differential signaling (LVDS), 10BASE-T1S. In further exemplary specific embodiments, bus system 10 may also include some type other than the types mentioned above by way of example, which includes a differential signal transfer.

Figure 5:
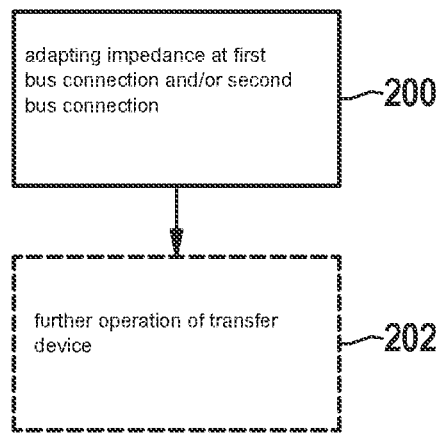
FIG. 5 schematically shows a simplified flowchart according to further exemplary specific embodiments of the present invention.

Further exemplary specific embodiments, FIG. 5, relate to a method for operating a transfer device 100 (FIG. 1) for a differential bus system 10, including a first bus connection 101 and a second bus connection 102 for connection to a transfer medium 12 of differential bus system 10, for example to differential bus lines 12a, 12b, and including a transmitting device 110 that is connected and/or connectable to first bus connection 101 and second bus connection 102, transfer device 100 including an impedance adaptation circuit 120, the method including: adapting 200 (FIG. 5) an impedance Z1, Z2 at first bus connection 101 and/or at second bus connection 102.

Optional further block 202 from FIG. 5 symbolizes an optional further operation of transfer device 100, which may involve, for example, a transmission and/or reception of signals with regard to differential bus system 10.

Figure 6:
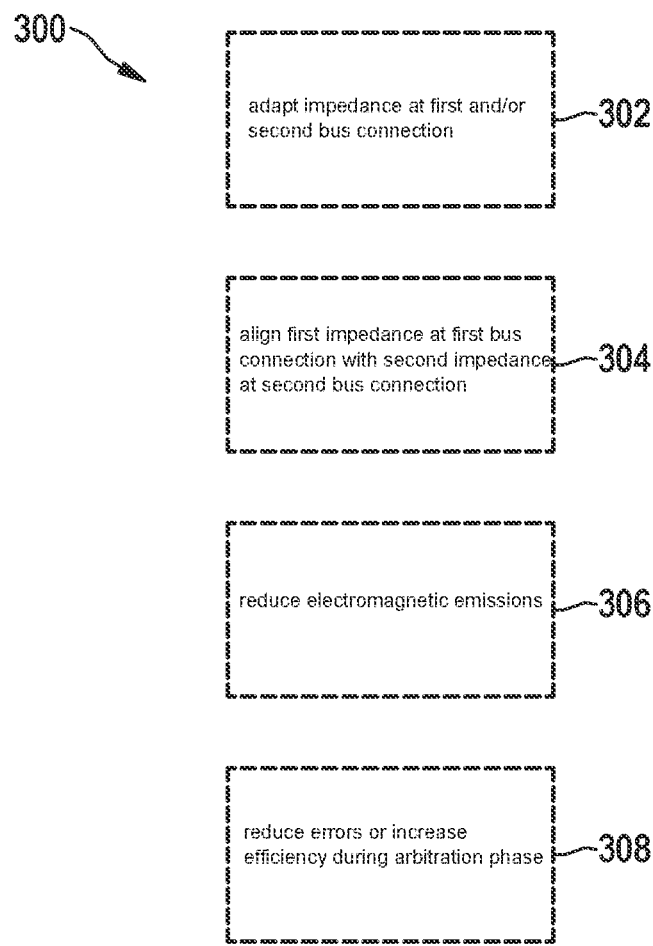
FIG. 6 schematically shows aspects of uses according to further exemplary specific embodiments of the present invention.

Further exemplary specific embodiments, FIG. 6, relate to use 300 of the transfer device according to the specific embodiments and/or of the method according to the specific embodiments for at least one of the following elements: a) adapting 302 an impedance (for example, first impedance Z1 and/or second impedance Z2) at least at first and/or second bus connection 101, 102, b) aligning 304, for example up to a predefinable difference value, first impedance Z1 at first bus connection 101 with second impedance Z2 at second bus connection 102 and/or vice versa, c) reducing 306 electromagnetic emissions, for example upon reception of signals with the aid of the transfer device, d) reducing 308 errors or increasing an efficiency during an arbitration phase, for example for a bus system 10 designed as CAN XL.

What is claimed is:

1. A transfer device for a differential bus system, comprising:
   a first bus connection and a second bus connection for connection to a transfer medium of the differential bus system;
   a transmitting device that is connected and/or connectable to the first bus connection and the second bus connection; and
   an impedance adaptation circuit that is configured to control an impedance at the first bus connection and/or an impedance at the second bus connection, wherein the control is based on a predefined or predefinable impedance difference value of a difference between the respective impedances at the first and second bus connections.

2. The transfer device as recited in claim 1, wherein the transfer medium includes differential bus lines.

3. The transfer device as recited in claim 1, wherein the impedance adaptation circuit includes at least one active semiconductor element.

4. The transfer device as recited in claim 1, further comprising a receiving device.

5. The transfer device as recited in claim 1, wherein the bus system includes one of the following types of bus systems: CAN, CAN FD, CAN FD SIC, CAN XL, LVDS, 10BASE-T1S.

6. A method for operating a transfer device for a differential bus system, the transfer device including a first bus connection and a second bus connection for connection to a transfer medium of the differential bus system, and including a transmitting device that is connected and/or connectable to the first bus connection and the second bus connection, the transfer device including an impedance adaptation circuit, the method comprising the following:
   controlling an impedance at the first bus connection and/or an impedance at the second bus connection, wherein the control is based on a predefined or predefinable impedance difference value of a difference between the respective impedances at the first and second bus connections.

7. The method as recited in claim 6, further comprising using the method for at least one of the following: a) aligning the first impedance at the first bus connection with the second impedance at the second bus connection, b) reducing electromagnetic emissions upon a reception of signals using the transfer device, and c) reducing errors or increasing an efficiency during an arbitration phase for a CAN XL bus system.

8. A transfer device for a differential bus system, comprising:
- a first bus connection and a second bus connection for connection to a transfer medium of the differential bus system;
- a transmitting device that is connected and/or connectable to the first bus connection and the second bus connection; and
- an impedance adaptation circuit that is configured to influence an impedance at the first bus connection and/or at the second bus connection;
- wherein the transfer device includes at least one of the following three features (I)-(III):
  - (I) the influence of the impedance for which the impedance adaptation circuit is configured is an influence of the impedance at the first bus connection and/or the second bus connection that ensures that the impedance at the first bus connection does not deviate from the impedance at the second bus connection by more than a maximum predefinable difference value;
  - (II) the impedance adaptation circuit includes a first active semiconductor element that is connected and/or connectable to the first bus connection and a second active semiconductor element that is connected and/or connectable to the second bus connection; and
  - (III) the impedance adaptation circuit includes at least one circuit component that represents a simulation of at least one portion of the transmitting device.

9. The transfer device as recited in claim 8, wherein the transfer device comprises at least feature (I) of the three features (I)-(III).

10. The transfer device as recited in claim 8, wherein the transfer device comprises at least feature (II) of the three features (I)-(III).

11. The transfer device as recited in claim 8, wherein the transfer device comprises at least feature (III) of the three features (I)-(III).

12. The transfer device as recited in claim 11, wherein the impedance adaptation circuit includes at least one circuit component that represents a complete simulation of the transmitting device.

13. The transfer device as recited in claim 12, wherein the at least one circuit component includes a series connection made up of a first diode, a first transistor, and a second transistor.

14. The transfer device as recited in claim 13, wherein:
a) the first diode of the at least one circuit component corresponds to a first diode of the at least one portion of the transmitting device, and/or
b) the first transistor of the at least one circuit component corresponds to a first transistor of the at least one portion of the transmitting device, and/or
c) the second transistor of the at least one circuit component corresponds to a second transistor of the at least one portion of the transmitting device.

\* \* \* \* \*